United States Patent
Douros et al.

(10) Patent No.: US 10,574,786 B2
(45) Date of Patent: Feb. 25, 2020

(54) METHODS AND SYSTEMS FOR CONTROLLED WIRELESS DISTRIBUTION OF DATA FOR USE AT A LOCATION WITHOUT RELIABLE WIRELESS CONNECTIVITY

(71) Applicant: MOTOROLA SOLUTIONS, INC., Schaumburg, IL (US)

(72) Inventors: Kenneth W. Douros, South Barrington, IL (US); James E. Mathis, Barrington, IL (US); Lee M. Proctor, Cary, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 319 days.

(21) Appl. No.: 15/149,590

(22) Filed: May 9, 2016

(65) Prior Publication Data
US 2017/0324833 A1   Nov. 9, 2017

(51) Int. Cl.
*H04L 29/08* (2006.01)
*H04N 21/24* (2011.01)
(Continued)

(52) U.S. Cl.
CPC ......... *H04L 67/322* (2013.01); *H04N 7/0117* (2013.01); *H04N 7/18* (2013.01);
(Continued)

(58) Field of Classification Search
USPC ........................................................ 709/217
See application file for complete search history.

(56) References Cited

U.S. PATENT DOCUMENTS 6,351,467 B1 * 2/2002 Dillon ............... G06F 17/30017
370/432
6,397,061 B1   5/2002 Jordan et al.
(Continued)

FOREIGN PATENT DOCUMENTS

WO   97/36405      10/1997
WO   2016/120694   8/2016

OTHER PUBLICATIONS

Stack Overflow, Feb. 9 2016, stackoverflow.com, [online], available from: https://stackoverflow.com/questions/35289020/what-are-good-ways-existing-to-transmit-data-to-multiple-mobile-phones- without [Accessed Oct. 12, 2017].
(Continued)

*Primary Examiner* — Brian Whipple
*Assistant Examiner* — John Fan
(74) *Attorney, Agent, or Firm* — Michael Best & Friedrich LLP

(57) ABSTRACT

A method and apparatus for wirelessly transmitting data to be utilized at an incident area. A server computer defines a prioritized list of data items to be transmitted to a plurality of portable electronic devices for use at the incident area. The server computer predicts a first amount of data that can be wirelessly transferred to a first electronic device before loss of reliable wireless connectivity with the first electronic device and automatically selects a first data item for transmission to the first electronic device. The server computer then transmits the first data item to the first electronic device to be shared with at least one other portable electronic device of the plurality of electronic devices upon arrival of the first electronic device at the incident area.

20 Claims, 9 Drawing Sheets

(51) Int. Cl.
  *H04N 21/462* (2011.01)
  *H04N 21/2343* (2011.01)
  *H04N 21/436* (2011.01)
  *H04N 7/18* (2006.01)
  *H04W 4/90* (2018.01)
  *H04W 4/021* (2018.01)
  *H04W 4/40* (2018.01)
  *H04N 7/01* (2006.01)
  *H04W 40/20* (2009.01)
  *H04W 64/00* (2009.01)

(52) U.S. Cl.
  CPC ..... *H04N 7/185* (2013.01); *H04N 21/234363* (2013.01); *H04N 21/234381* (2013.01); *H04N 21/2402* (2013.01); *H04N 21/43615* (2013.01); *H04N 21/4622* (2013.01); *H04W 4/021* (2013.01); *H04W 4/40* (2018.02); *H04W 4/90* (2018.02); *H04W 40/20* (2013.01); *H04W 64/006* (2013.01)

(56) References Cited

U.S. PATENT DOCUMENTS

| | | |
|---|---|---|
| 6,973,318 B2 | 12/2005 | Jambhekar et al. |
| 7,103,024 B2 | 9/2006 | Wilson |
| 8,351,449 B1 * | 1/2013 | Shmulevich .......... H04L 47/568 370/229 |
| 8,805,963 B2 * | 8/2014 | Pantos ................ H04L 65/1083 709/219 |
| 8,966,560 B2 | 2/2015 | Tine et al. |
| 9,106,787 B1 | 8/2015 | Holmer et al. |
| 2009/0232160 A1 | 9/2009 | Wu et al. |
| 2011/0082940 A1 | 4/2011 | Montemurro et al. |
| 2013/0151659 A1 | 6/2013 | Alberth et al. |
| 2014/0155024 A1 | 6/2014 | Chetlur et al. |
| 2015/0106787 A1 | 4/2015 | Whitcomb et al. |
| 2015/0111516 A1 | 4/2015 | Schuette et al. |
| 2015/0269624 A1 * | 9/2015 | Cheng ................ G06Q 30/0267 705/14.58 |
| 2015/0281651 A1 | 10/2015 | Kaushik et al. |
| 2016/0203522 A1 * | 7/2016 | Shiffert ................ H04W 76/14 705/14.58 |
| 2017/0295569 A1 * | 10/2017 | Difrancesco ........ H04W 72/048 |

OTHER PUBLICATIONS

GB1076173.0 Combined Search and Examination Report dated Oct. 19, 2017 (6 pages).

* cited by examiner

| PRIORITY # | DATA ITEM | FILE TYPE | SIZE | REDUCIBLE? | CRITICAL? |
|---|---|---|---|---|---|
| 1 | INCIDENT REPORT | TEXT | 1 MB | NO | YES |
| 2 | TRANSCRIPT OF 911 CALL | TEXT | 1 MB | NO | YES |
| 3 | SUSPECT PROFILE | TEXT & IMAGE | 5 MB | YES | YES |
| 4 | FLOORPLAN MAP | IMAGE | 1 MB | NO | NO |
| 5 | SECURITY CAMERA FOOTAGE | VIDEO | 2 GB | YES | NO |
| 6 | AUDIO OF 911 CALL | AUDIO | 20 MB | YES | NO |

FIG. 5

METHODS AND SYSTEMS FOR CONTROLLED WIRELESS DISTRIBUTION OF DATA FOR USE AT A LOCATION WITHOUT RELIABLE WIRELESS CONNECTIVITY

BACKGROUND OF THE INVENTION

When responding to incidents in field locations, portable electronic devices may be used to provide access to relevant information. For example, an emergency responder—such as a police officer or emergency medical technician (EMT)—may utilize digital information relevant to the specific incident to which they are responding. In geographic areas with reliable wireless connectivity, this information can be downloaded and accessed on demand from the site of the incident. However, when the user is responding to an incident located in an area without reliable wireless connectivity, the user would either proceed without access to such digital resources/information while responding to the incident or would transfer the relevant information to the portable electronic device before travelling to the incident site.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 5 is table illustrating a prioritized list of data items to be transmitted to one or more portable electronic devices in transit to an incident area in accordance with some embodiments.

Figure 1:
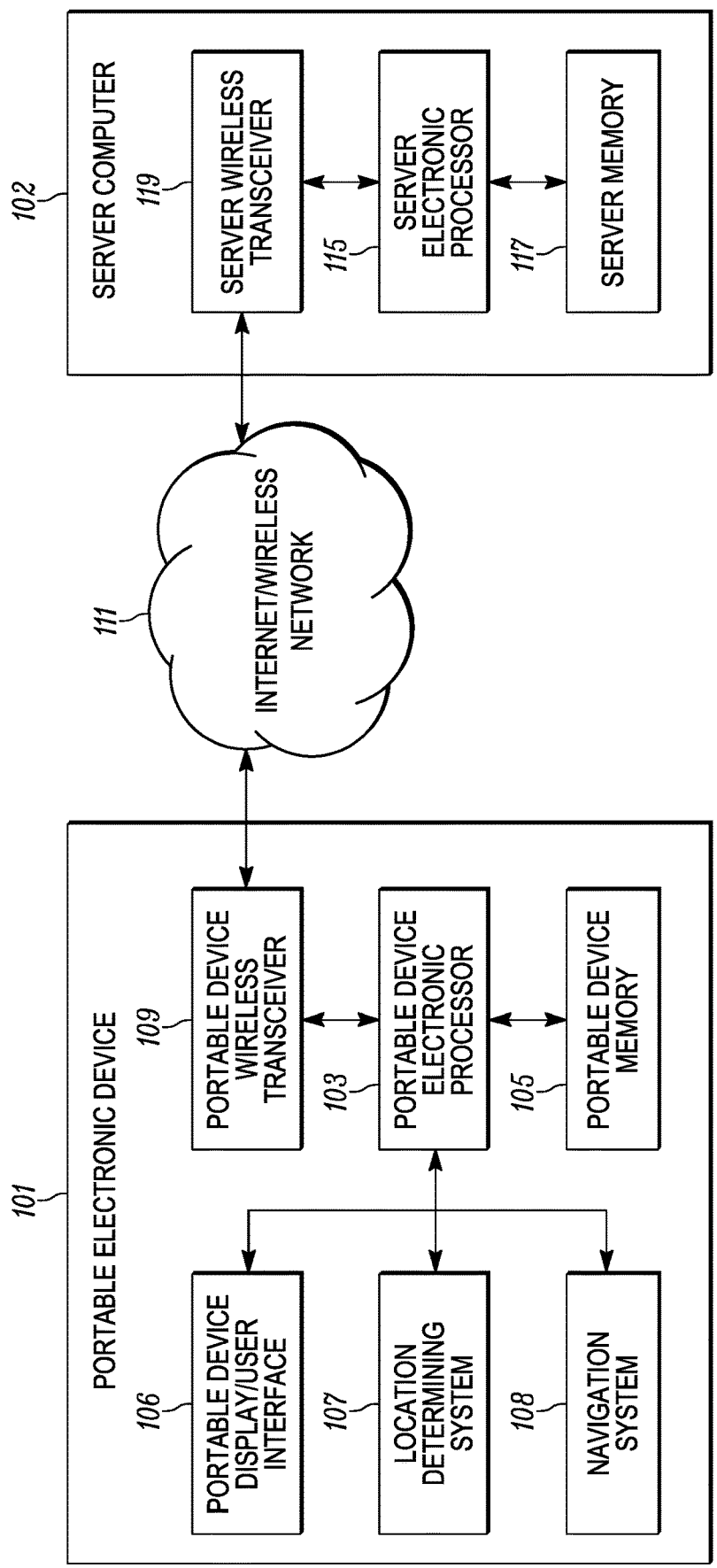
FIG. 1 is a block diagram of a portable electronic device in wireless communication with a server computer in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Methods and systems provided in this disclosure wirelessly transmit data to be utilized at an incident area. A server computer defines a prioritized list of data items to be transmitted to a plurality of portable electronic devices for use at the incident area. The server computer determines a first estimated travel plan for a first electronic device of the plurality of portable electronic devices in transit to the incident area. Based on the first estimated travel plan, the server computer predicts a first amount of data that can be wirelessly transmitted to the first electronic device before loss of wireless connectivity. The server computer automatically selects a first data item for transmission to the first electronic device from the prioritized list of data items based on a size of the first data item, a relative priority of the first data item, and the predicted first amount of data that can be wirelessly transmitted to the first electronic device before wireless connectivity with the first electronic device is lost. The server computer then transmits the first data item to the first electronic device to be shared with at least one other portable electronic device of the plurality of electronic devices upon arrival of the first electronic device at the incident area.

FIG. 1 is a block diagram of one example of a portable electronic device 101 in wireless communication with a server computer 102. The example of FIG. 1 is just one possible implementation of the systems and methods presented in this disclosure. In other implementations, the portable electronic device 101 may include more or fewer components. Similarly, in some other implementations, certain components that are illustrated as part of the portable electronic device 101 in the example of FIG. 1 may be provided as part of other devices or as separate, stand-alone devices.

In the example of FIG. 1, the portable electronic device 101—for example, a portable land mobile radio, smart telephone, or tablet computer—includes a portable device electronic processor 103 and a portable device memory 105. The portable device electronic processor 103 is communicatively coupled to the portable device memory 105 which stores data and instructions that are executable by the portable device electronic processor 103 to control the operation of the portable electronic device 101. The portable device memory 105 includes one or more non-transitory computer-readable memory devices such as, for example, random access memory (RAM), read-only memory (ROM), Flash memory, or optical/magnetic disk storage.

The portable electronic device 101 also includes a portable device display/user interface 106 including, for example, a touch-sensitive display. However, in other implementations, the portable device display/user interface 106 may include other input and output user interface components such as one or more buttons, dials, or controls and one or more display screens or other visual or audio output devices. The portable electronic device 101 is equipped with a location determining system 107 such as a global positioning system (GPS) and, in some implementations, a navigation system 108 as discussed in further detail below. Although, in the example of FIG. 1, the location determining system 107 and the navigation system 108 are illustrated as components of the portable electronic device 101, in some other implementations, these component may be provided as a separate guidance system or may be incorporated, for example, into a dashboard interface of a vehicle.

The portable electronic device 101 further includes a portable device wireless transceiver 109 providing wireless communication between the portable electronic device 101 and a wireless network 111. In some implementations, the portable device wireless transceiver 109 is a cellular transceiver connectable to a cellular telephone network. In some implementations, the portable device wireless transceiver 109 is configured to connect the portable electronic device to a propriety/private wireless network while, in other implementations, the portable device wireless transceiver 109 communicatively couples the portable electronic device 101 to the Internet.

As long as the portable electronic device 101 remains in range of the wireless network 111, the portable electronic device 101 is capable of wireless communication with the server computer 102. The server computer 102 also includes a server electronic processor 115 and a server memory 117 which stores data and instructions that are executed by the server electronic processor 115 to control the operation of the server computer 102. The server computer 102 also includes a server wireless transceiver 119 for communicatively coupling the server computer 102 to the wireless network 111. However, in some implementations, the server computer 102 may instead be coupled to the network 111 via a wired connection interface. Again, the server computer 102 illustrated in FIG. 1 is an example of one implementation. In other implementations, the server computer 102 may include more or fewer components and, similarly, the components and functions discussed in this disclosure as being related to the server computer 102 may be provided as one or more separate devices or configurations in other implementations.

In the example of FIG. 1, the portable electronic device 101 is carried by a user responding to a specific incident at a specific geographic location. For example, the portable electronic device 101 might be a land mobile radio carried by an emergency first responder (such as a police officer or an emergency medical technician (EMT)) responding to a criminal, safety, or medical emergency. The server computer 102 is configured to identify data items (e.g., text files, photographs, video, audio, etc.) relevant to the particular incident and/or the particular geographic location that would be of use to personnel at the incident area. The server computer 102 transmits these data items to one or more portable electronic devices either on demand (i.e., in response to a specific request from a portable electronic device) or automatically and proactively when a portable electronic device (or a user associated with the particular portable electronic device) is dispatched to respond to the incident. Alternatively, in some implementations, a dispatcher may operate a user interface of the server computer to compile or adjust a list of data items that are relevant or required for the incident area.

Figure 2A:
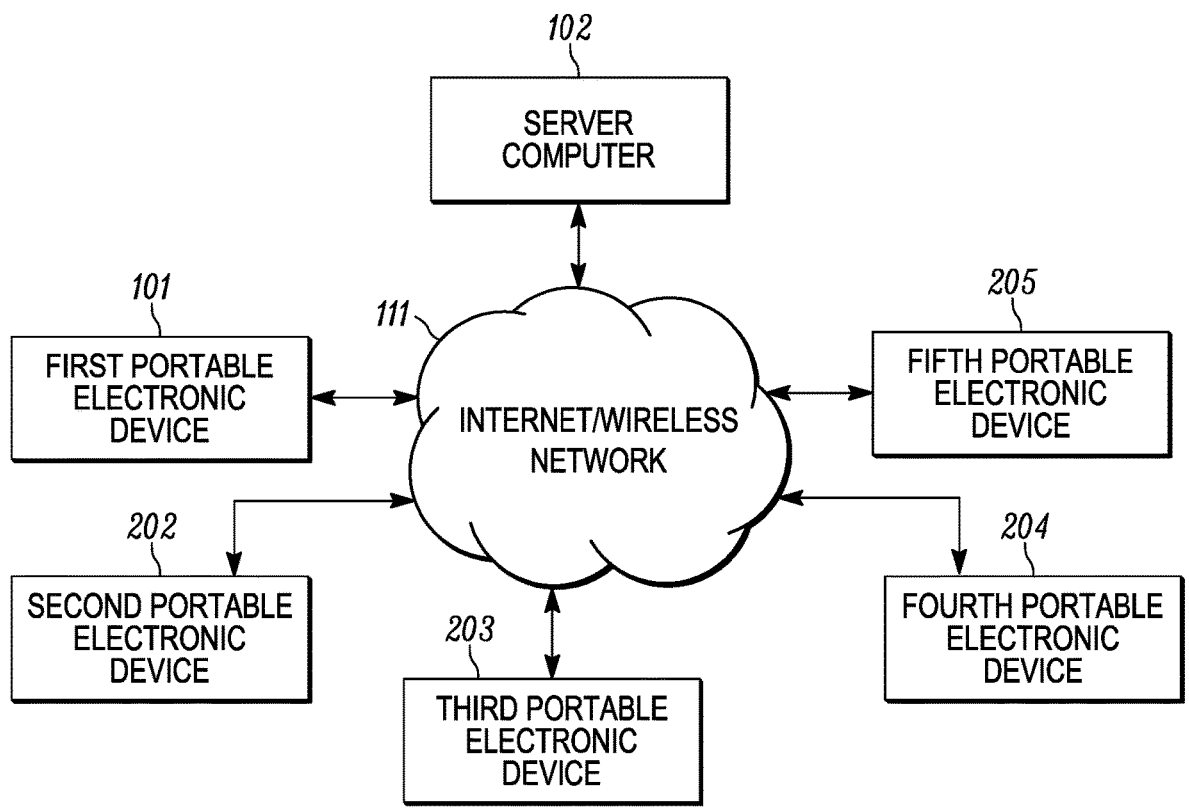
FIG. 2A is a block diagram of a server computer in wireless communication with a plurality of portable electronic devices in accordance with some embodiments.

As illustrated in FIG. 2A, the server computer 102 is capable of maintaining connectivity through the wireless network 111 with the first portable electronic device 101 and with a plurality of other portable electronic devices (e.g., a second portable electronic device 202, a third portable electronic device 203, a fourth portable electronic device 204, and a fifth portable electronic device 205) as long as the portable electronic devices all remain within range of the wireless network 111—that is, in geographic areas with reliable wireless connectivity. In the examples discussed below, particularly in reference to FIG. 2A and FIG. 2B, the other portable electronic devices 202, 203, 204, and 205 are configured similarly to the portable electronic device 101 as illustrated in FIG. 1 above. However, in some implementations, the various portable electronic devices dispatched to the same incident can include multiple different types of portable electronic devices (e.g., smart phones, tablet computers, etc.).

The precise meaning of the phrase "reliable wireless connectivity" can vary, for example, based on the particular system application, context, or user preference. In some situations, a "geographic area with reliable wireless connectivity" may refer to a defined geographic area where the portable electronic device 101 will be able to connect to the server computer 102 and transfer data at or above a defined minimum transfer threshold. In other situations, "reliable wireless connectivity" may mean that the portable electronic device 101 can connect to the wireless network (e.g., a cellular phone network) with a signal strength at or above a defined threshold and/or with a defined minimum level of uninterrupted service.

Conversely, an area "without reliable wireless connectivity" is a geographic area or location where wireless connectivity is expected to be (or is observed to be) below the minimum requirements designated for the particular implement as "reliable wireless connectivity." Similarly, the phrase "poor wireless connectivity" or "poor wireless coverage area" as used in this disclosure generally refers to a connectivity condition that is expected to be or is observed to be below a defined minimum level of performance capabilities. For example, in some implementations, "poor wireless connectivity" may be defined as a complete inability for the portable electronic device 101 to connect or communicate with the wireless network 111. In other implementations, "poor wireless connectivity" may refer to a condition where the frequency or length of interruptions of connectivity between the portable electronic device 101 and the wireless network 111 exceed a defined minimum threshold. In still other implementations, "poor wireless connectivity" may be defined as a connectivity condition where the expected or observed data transfer rate between the portable electronic device 101 and the server computer 102 is below a defined minimum threshold.

In some implementations where the portable electronic device 101 is configured to communicate with the server computer 102 through wireless network 111 that includes a cellular phone network, geographic areas with "reliable wireless connectivity" and geographic areas without "reliable wireless connectivity (or with "poor wireless connectivity") can be defined based on coverage maps generated and provided by the cellular service provider. In some implementations, "reliable wireless connectivity" and "poor wireless connectivity" are not necessarily binary conditions. For example, in some implementations, the server computer 102 and the portable electronic device 101 may operate based on multiple different geographic areas each with a different defined level of "reliable wireless connectivity."

Figure 2B:
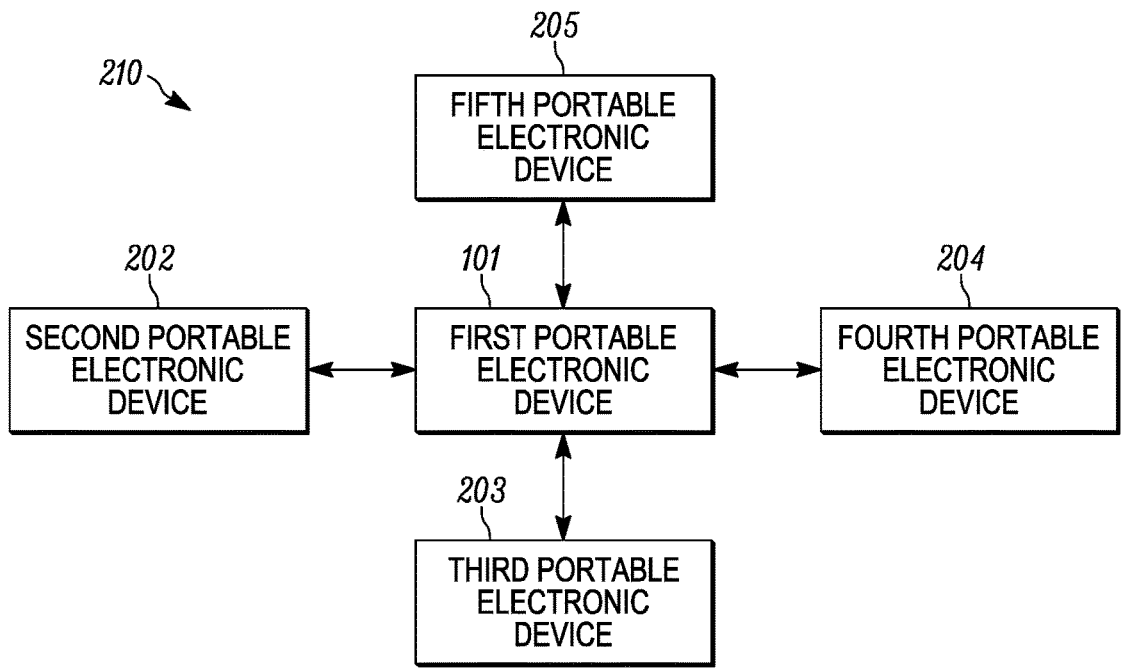
FIG. 2B is a block diagram of the plurality of electronic devices of FIG. 2A communicating in an incident area network in accordance with some embodiments.

Furthermore, the phrases "wireless connectivity" and "wireless coverage area" refer to the connectivity between the portable electronic device 101 and a wireless network 111 that would enable the portable electronic device 101 to communicate with the server computer 102. When the portable electronic device 101 arrives at an incident area that is located in a geographic area without reliable wireless connectivity, the portable electronic device 101 may not be able to communicate with the server computer 102 through the wireless network 111. However, even after reliable wireless connectivity with the wireless network 111 is lost, the portable electronic device 101 can communicate directly and, in some implementations, wirelessly with the other portable electronic devices 202, 203, 204, 205 located at the incident area as illustrated in FIG. 2B. FIG. 2B illustrates an example of an incident area network 210 formed by the portable electronic devices 101, 202, 203, 204, 205 at the incident area. In this example, the first portable electronic device 101 is configured to act as the "host" or "hub" of the incident area network 210. However, this is only one example of a topology for an incident area network and other configurations are possible. For example, the portable electronic devices may be configured to communicate directly with any of the other individual portable electronic devices within range or that have been added to the incident area network.

Figure 3:
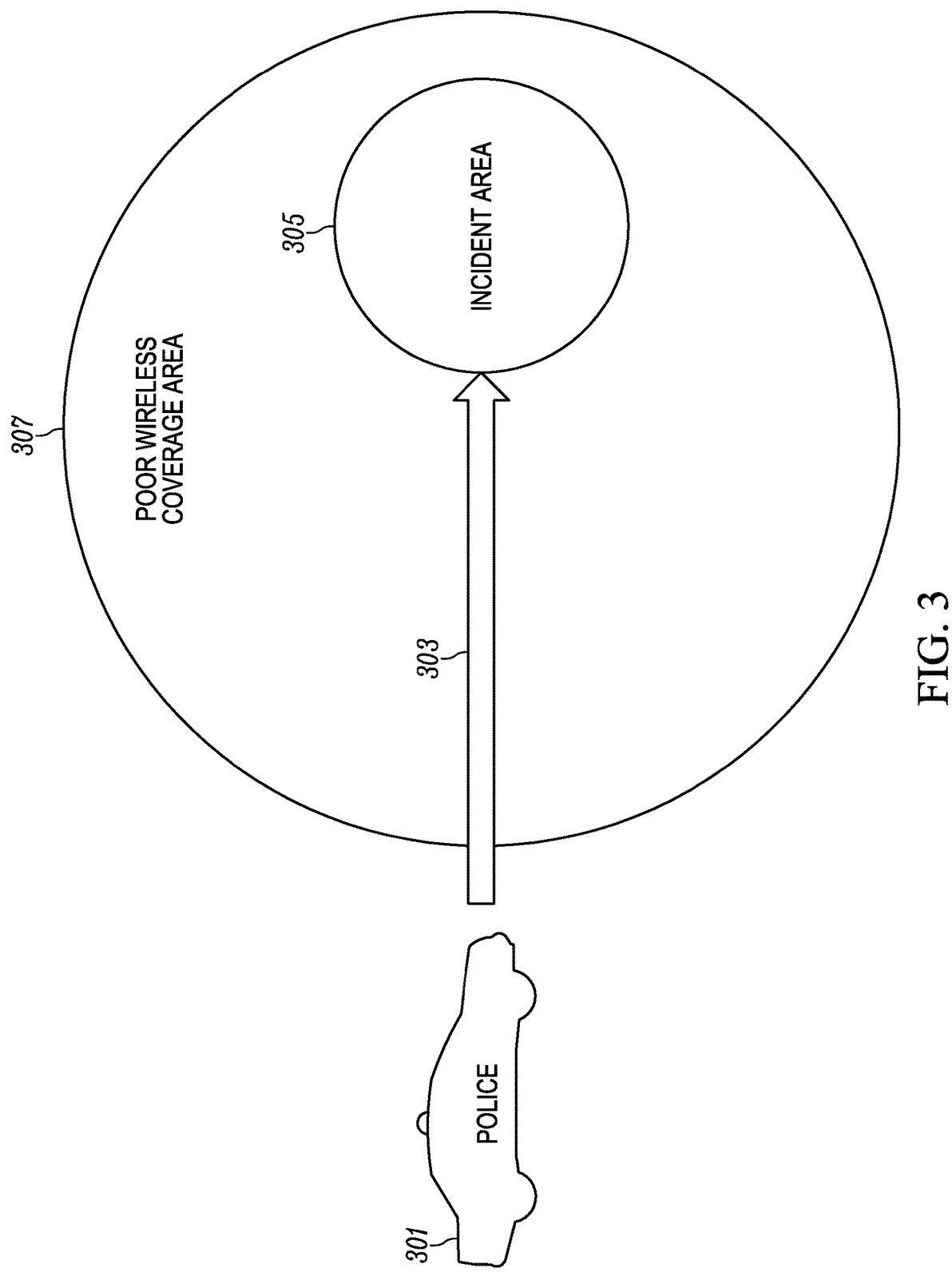
FIG. 3 is a diagram of a vehicle in transit to an incident area located in a poor wireless coverage area in accordance with some embodiments.

FIG. 3 illustrates a scenario where a response vehicle 301 is in transit along a predicted path of travel 303 to an incident area 305. The response vehicle 301 begins its travel in an area with reliable wireless connectivity. However, the incident area 305 is located in a poor wireless coverage area 307 (e.g., an area with unreliable wireless connectivity). As such, a portable electronic device 101 mounted within the response vehicle 301 or carried by a user within the response vehicle 301 is only able to communicate with the server computer 102 until the response vehicle 301 enters the poor wireless coverage area 307. After reliable wireless connectivity is lost—while travelling in the poor wireless coverage area 307 and after arriving at the incident area 305—the portable electronic device 101 may not be able to communicate with the server computer 102 and, therefore, will no longer be able to receive data items directly from the server computer 102.

However, the server computer 102 is configured to predict when the response vehicle 301 and, thereby, the portable electronic device 101, will enter the poor wireless coverage area 307. For example, in some implementations, when the response vehicle 301 is dispatched to the incident area 305, the location determining system 107 (see, FIG. 1) of the portable electronic device 101 determines a current location of the portable electronic device and the navigation system 108 determines a path of travel from the current location to the incident area. Once a path of travel is determined, the portable electronic device 101 transmits this information to the server computer 102 which then compares the information to one or more wireless coverage maps to determine an estimated amount of time remaining until the response vehicle 301 and, thereby, the portable electronic device 101 will enter the poor wireless coverage area 307 and lose reliable wireless connectivity.

In some implementations, the portable electronic device 101 may be configured to selectively connect to one of multiple different wireless networks (including wireless network 111). For example, the portable electronic device 101 may be configured to connect with a different wireless network (or perhaps even a completely different wireless communication medium) to communicate with the server computer 102 when reliable wireless connectivity with the first wireless network 111 is lost. Therefore, in evaluating the path of travel for the response vehicle 301 and determining the amount of time remaining, the server computer 102 may also determine which wireless networks the portable electronic device 101 might connect with along the path of travel and thereby determine an estimated amount of time remaining until the response vehicle 301 enters an area where the portable electronic device 101 is unable to communicate with the server computer 102 through any available communication channel.

In some implementations, such as in the example of FIG. 1, the location determining system 107 and the navigation system 108 are built into the portable electronic device 101. However, in other implementations—for example, where a portable electronic device is designed to be transported to an incident in a response vehicle—the current location of the portable electronic device and the determined path of travel can be determined by another, separate device (e.g., a navigation system installed in the response vehicle) and electronically communicated either to the portable electronic device or directly to the computer server 102. In still other implementations, a driver of the response vehicle is prompted by the portable electronic device to manually enter path of travel information into the portable electronic device.

Furthermore, in some implementations, the server computer 102 operates cooperatively with the portable electronic device 101 to determine a path of travel from a current location to the incident area 305. For example, in some implementations, the server computer 102 is configured to balance a relative urgency of prompt arrival of the response vehicle 301 at the incident area 305 as compared to the importance of complete transmission of data items (as discussed in further detail below). In some such implementations, the server computer 102 and the navigation system (e.g., the navigation system 108 of the portable electronic device 101 or a separate navigation system of the response vehicle 301) may select a path of travel for the response vehicle 301 that, although not the quickest route to the incident area 305, keeps the response vehicle 301 in areas with reliable wireless connectivity for a longer period of time.

In some implementations, the navigation system 108 and the server computer 102 are configured to also utilize other information in determining the path of travel and the estimated amount of time remaining until reliable connectivity is lost. For example, the server computer 102 may access current traffic information and use this traffic information to determine a quicker path of travel to the incident area 305 and to more accurately determine the amount of time remaining until the response vehicle 301 enters the poor wireless coverage area 307. The navigation system 108 and the server computer 102 may also be configured to periodically or continually update the estimated amount of time remaining based on changes to the current location of the response vehicle 301 (as determined by the location determining system 107) or a current speed of the response vehicle 301.

The server computer 102 and the portable electronic device 101 may also be configured to continually monitor the speed at which data is being transmitted to the portable electronic device 101 and calculate a predicted data amount (e.g., how many megabytes) that can be transferred to the portable electronic device 101 before wireless connectivity is lost. For example, based on the travel time remaining (e.g., in seconds) until the response vehicle 301 enters the poor wireless coverage area 307 and the current (and expected) wireless data transmission rate (e.g., in megabytes per second), the server computer 102 can calculate an estimated number of megabytes of data that can be transferred to the portable electronic device 101. In some implementations, the wireless coverage maps also provide information (either in real-time or based on previously measured benchmarks) regarding wireless transmission rates that are expected in geographic areas along the determined path of travel. In some such implementations, the server computer 102 and/or the portable electronic device 101 estimate a total data amount that can be (or is predicted to be) transmitted from the server computer 102 to the portable electronic device 101 before connectivity is lost based on the geography of the coverage map, current location of the portable electronic device 101, the determined path of travel for the portable electronic device 101, current traffic information (particularly in scenarios and implementations where the portable electronic device 101 is transported to the incident area 305 in the response vehicle 301), current travel speed of the portable electronic device 101 (or speed of the response vehicle 301 transporting the portable electronic device 101), current data transmission speed for the portable electronic device 101, and anticipated data transmission speeds for areas along the determined path of travel.

Figure 4:
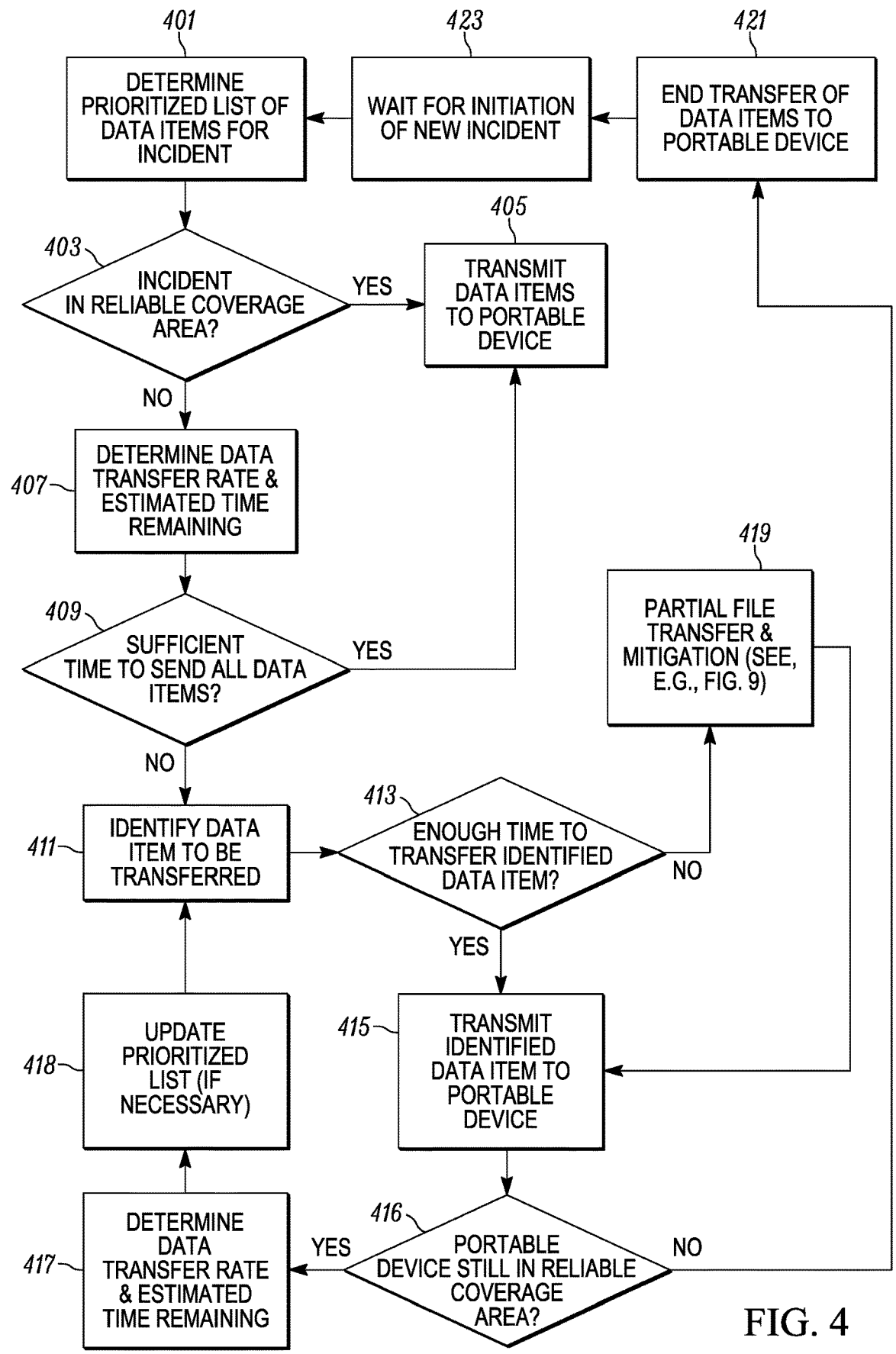
FIG. 4 is a flowchart of a method for transmitting data items from a server computer to a portable electronic device in transit to an incident area in accordance with some embodiments.

Based on the estimated time remaining and the predicted data amount that can be transmitted to the portable electronic device 101 before wireless connectivity is lost, the server computer 102 manages scheduling, prioritization, and transmission of data items to portable electronic devices that are in transit to the incident area. FIG. 4 illustrates one example of a method for managing such data transmissions. At block 401, the server computer determines a prioritized list of data items for an incident. In some implementations, the prioritized list is determined based on the relative importance of a particular data item for personnel responding to a particular incident. For example, in some implementations, the server computer 102 stores a data base or look-up table with a pre-defined prioritized list of data items for each of a plurality of different types of incidents. The database might also define additional information relevant to each particular type of incident including an initial number of response vehicles or people to be dispatched to the incident area for a particular incident type. In some such implementations, the server computer 102 is further configured to adjust or re-prioritize the list based on additional information such as, for example, whether a particular data item is absent from the data items stored on the server computer. Alternatively, in some implementations, the prioritized list can be generated or edited manually by a dispatcher.

FIG. 5 provides an example of a prioritized list of data items for a particular incident. In this example, the prioritized list generated by the server computer includes a relative priority number for each data item, an indication of the file type, a size of each data item, an indication of whether the data item can be reduced (as discussed in further detail before) and an indication of whether the data item is considered "critical" for the incident.

FIG. 5 is just one example of a prioritized list and, in other implementations, the prioritized list can include other data fields and use such additional data determine an appropriate priority. For example, some or all data items may include a timestamp indicating when the data item was created or updated. For some incidents (e.g., public safety emergencies), a recently created/acquired data item may make significantly increase the relative priority and importance of the data item. The prioritized list may also include an indication of the source of the file (e.g., is the data item from a news source, a government survey, etc.). In some incidents, data integrity and the reliability of a source of a data item can also significantly affect the relative priority and importance of the data item.

Returning now to FIG. 4, once the prioritized list of data items is generated, the server computer 102 determines at block 403 whether the incident area is located in a reliable wireless coverage area—that is, whether the location of the incident is in a geographic area where the portable electronic device 101 is expected to have reliable wireless connectivity to one or more wireless networks and, thereby, be able to communicate with the server computer 102. As discussed above, a "reliable wireless coverage area" or an area with "reliable wireless connectivity" may be a geographic area included within a designated coverage area/map for the provider of the wireless network 111 (e.g., a cellular network provider) or may be determined by the server computer 102 based on other predefined performance benchmark criteria.

When the incident area is located in a reliable wireless coverage area, the server computer begins to transmit data items to the portable device 101 at block 405. Because the portable electronic device 101 is expected to maintain reliable wireless connectivity at the incident area, the server computer 102 does not need to take any remedial steps to manage transmission of data items and, in some implementations, the server computer 102 may be further configured to transmit particular data items to the portable electronic device 101 only as they are requested by a user of the portable electronic device 101.

When the server computer determines that the incident area is located in a poor wireless coverage area, the server computer determines at block 407 an estimated data transfer rate and an estimated time remaining until wireless connectivity for the portable electronic device 101 is expected to no longer be reliable (for example, as discussed above in reference to FIG. 3). Based on this information, the server computer 102 determines at block 409 whether enough time is available to transfer all of the data items in the prioritized list of data items. When the server computer 102 determines that enough time remains to transmit all of the data items to the portable electronic device 101 before wireless connectivity is lost or will become unreliable, then again the server computer begins transferring data items to the portable electronic device 101 in the order of the prioritized list at block 405. But, when the server computer 102 determines that it will not be able to transmit all of the relevant data items to the portable electronic device 101, then the server computer 102 takes additional steps to ensure that each high-priority data item is transmitted to at least one of the plurality of portable electronic devices so that it is available for use at the incident area.

At block 411, the server computer 102 identifies a particular data item to be transferred to a particular portable electronic device 101 that is in transit to the incident area and is still located in an area with reliable wireless connectivity. The server computer 102 then determines at block 413 whether enough time remains to transfer the identified data item to the portable electronic device 101 before wireless connectivity is expected to become unreliable. When enough time remains to transfer the entire data item to the portable electronic device 101 given the current/expected data transfer speed, the server computer 102 transmits the identified data item to the portable electronic device 101 at block 415. Upon completion, the server computer 102 confirms whether the portable electronic device is still within the reliable coverage area at block 416 and, if so, determines an updated data transfer rate and an estimated time remaining for the particular portable electronic device 101 at block 417. In some scenarios and implementations, new data items can become available after portable electronic devices have been dispatched to the incident. Similarly, changes in the status of an incident might alter the relative priority of certain data items. Therefore, in some implementations, the server computer 102 updates the prioritized list of data items as necessary at block 418.

Based on the updated estimates and on any updates to the prioritized list of data items, the server computer 102 determines whether the next identified data item in the prioritized list can be transferred to the particular portable electronic device 101 in time. When the server computer 102 determines that the identified data item cannot safely be transmitted to the particular portable electronic device 101 before wireless connectivity with the portable electronic device 101 is expected to become unreliable, the server computer 102 implements remedial steps at block 419. As discussed in further detail below, these remedial steps may include, for example, partial file transfers across multiple portable electronic devices (to be reassembled upon arrival at the incident area) and reduction of file size (e.g., by reducing the length or resolution), to ensure that critical data is made available at the incident area.

The server computer 102 continues to identify data items from the prioritized list that can be transferred to the portable electronic device 101 in the time remaining before wireless connectivity is expected to become unreliable. When the server computer 102 determines that the portable electronic device 101 is no longer in the reliable coverage area at block 416, the server computer 102 ends the transfer of data items to the portable electronic device 101 for this particular incident at block 421 and waits for a new incident to be initiated at block 423.

Although the examples discussed above with reference to FIGS. 3 and 4 focus on interactions between the server computer 102 and a single portable electronic device 101, the server computer 102 manages file transfers for all portable electronic devices in transit to the same incident area. As such, in identifying an individual data item to be transferred to a particular portable electronic device 101, the server computer 102 also maintains an updated accounting for the status of other portable electronic devices including which files have already been sent to other portable electronic devices.

Figure 6:
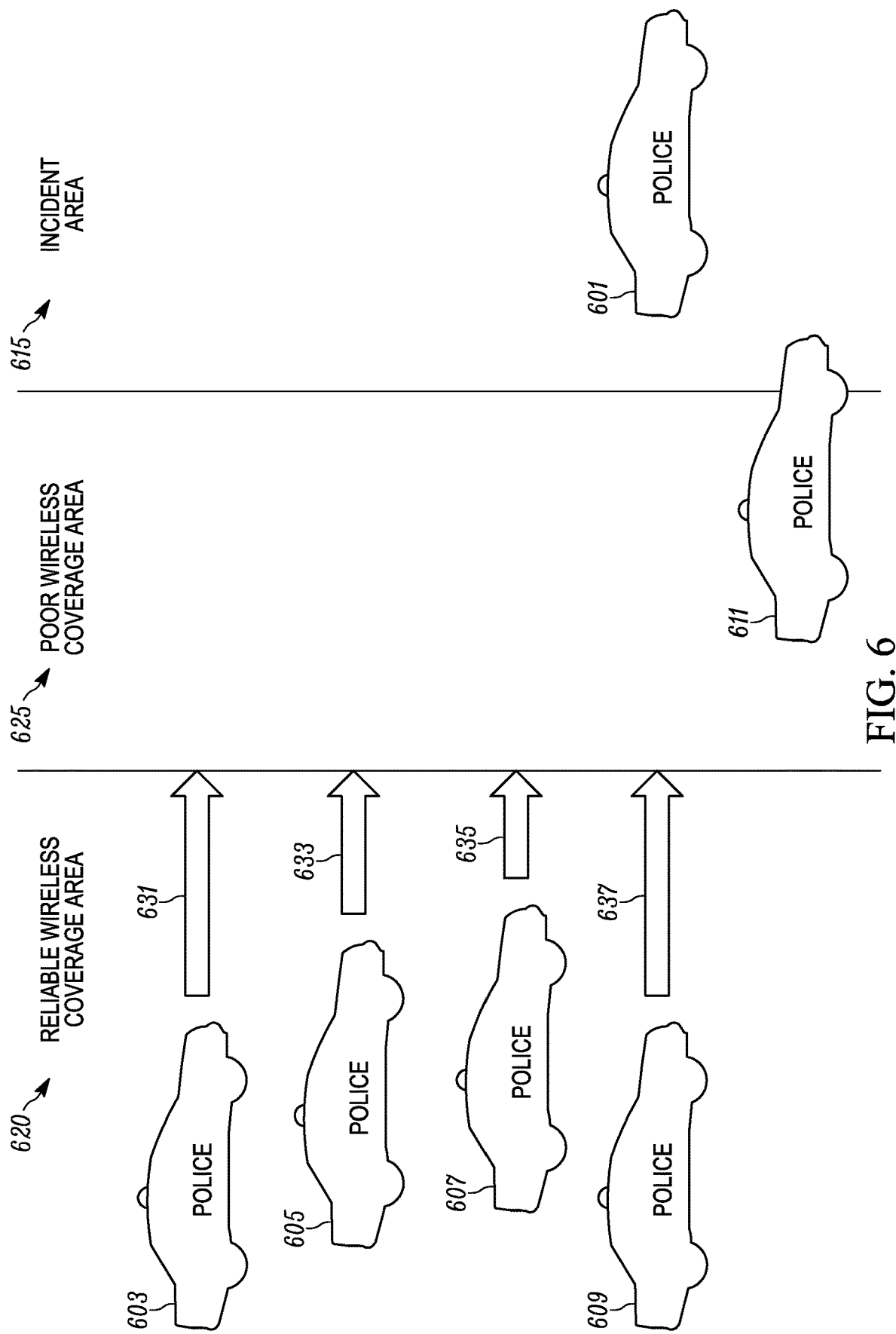
FIG. 6 is a diagram of a plurality of vehicles in transit to an incident area located in a poor wireless coverage area in accordance with some embodiments.

FIG. 6 illustrates an example of a situation where six response vehicles (a first vehicle 601, a second vehicle 603, a third vehicle 605, a fourth vehicle 607, a fifth vehicle 609, and a sixth vehicle 609) have been dispatched to the same incident area 615. The first vehicle 601 has already arrived at the incident area 615 while the remaining vehicles are still in transit. Four of the vehicles—the second vehicle 603, the third vehicle 605, the fourth vehicle 607, and the fifth vehicle 609—are still located in a reliable wireless coverage area 620 while the sixth vehicle 611 has already entered a poor wireless coverage area 625.

Because the incident area 615 in the example of FIG. 6 is located in the poor wireless coverage area 625, all of the vehicles are expected to eventually lose reliable wireless connectivity. However, based on the current geographic position and the determined travel path for each vehicle, the server computer 102 is able to determine a first predicted data amount 631 that can be transmitted to a portable electronic device transported by the second vehicle 603 before the second vehicle 603 will enter the poor wireless coverage area 625. Similarly, the server computer determines a second predicted data amount 633 that can be transmitted to a portable electronic device transported by the third vehicle 605 before the third vehicle 605 will enter the poor wireless coverage area 625, a third predicted data amount 635 that can be transmitted to a portable electronic device transported by the fourth vehicle 607 before the fourth vehicle 607 will enter the poor wireless coverage area 625, and a fourth predicted data amount 637 that can be transmitted to a portable electronic device transported by the fifth vehicle 609 before the fifth vehicle 609 will enter the poor wireless coverage area 625. In general, the predicted data amount for a given vehicle will be larger for vehicles that have farther left to travel in the reliable wireless coverage area 620 and, similarly, may have farther left to travel before arriving at the incident area 615. However, this is not always the case and, instead, the server computer 102 in this example determines both an estimated time until arrival at the incident area 615 and volume predicted data amount for each vehicle in transit to the incident area 615.

Figure 7:
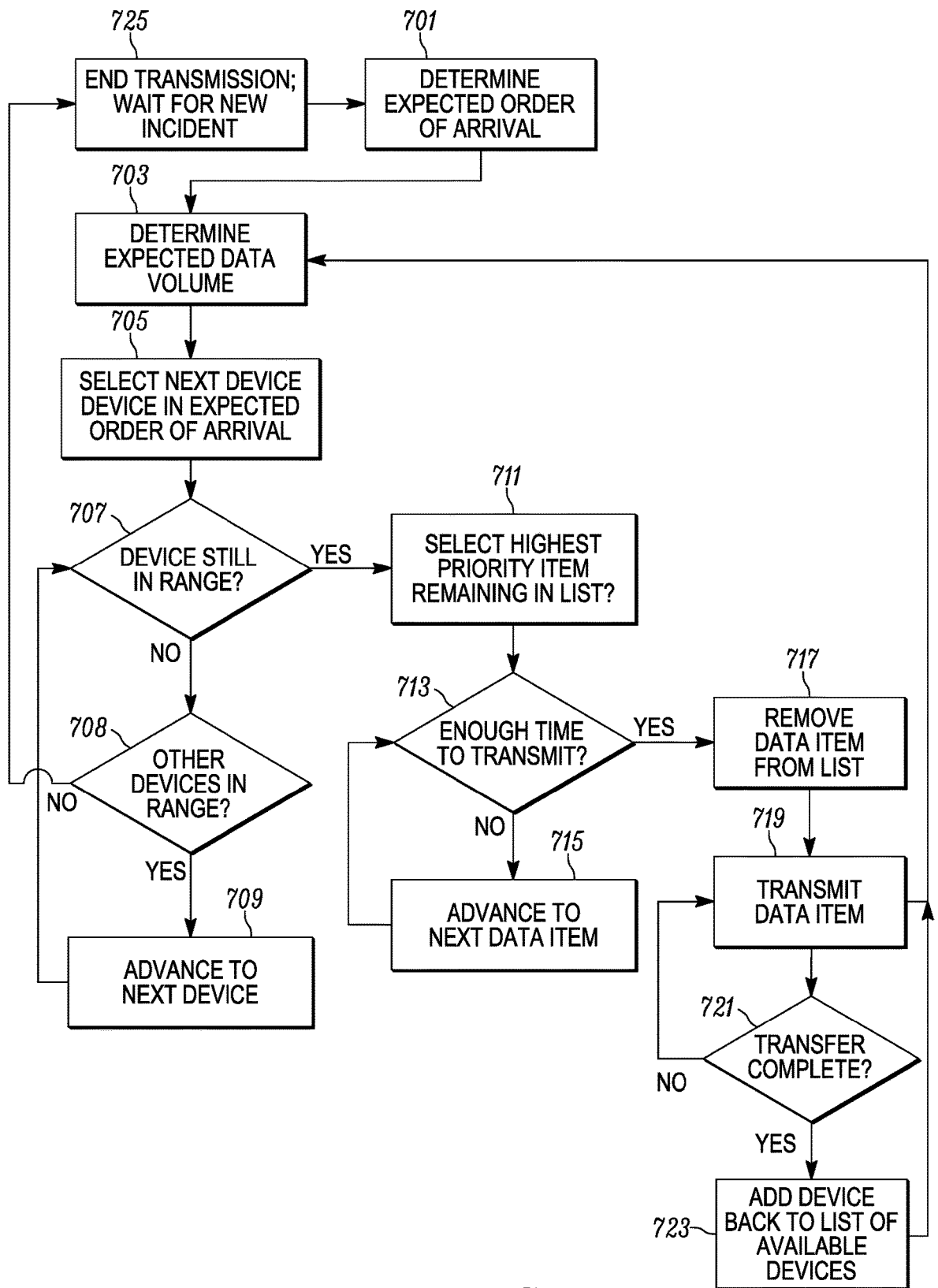
FIG. 7 is a flowchart of a method for transmitting data items from a server to the portable electronic devices associated with each of the plurality of vehicles in transit to the incident area in FIG. 6 in accordance with some embodiments.

FIG. 7 illustrates an example of a method implemented by the server computer 102 of FIG. 1 for managing the transmission of data items to portable electronic devices in each of the multiple cars in transit to the same incident area 615 to best ensure that the highest priority data items from the prioritized list of data items are available on at least one portable electronic device at the incident area 615 to be shared with the other portable electronic devices. At block 701, the server computer 102 determines an expected order of arrival for the vehicles in transit to the incident area 615 and, at block 703, determines volume predicted data amount that can be transmitted to each portable electronic device before that vehicle enters the poor wireless coverage area 625.

In the method of FIG. 7, the server computer 102 attempts to transmit the highest priority data items from the prioritized list of data items to the portable electronic device that will be arriving earliest at the incident area 615. As such, at block 705, the server computer 102 selects the next portable electronic device in the expected order of arrival (i.e., the portable electronic device currently in transit that is expected to arrive at the incident area 615 next) and, at block 707, determines whether the selected portable electronic device is still in range (e.g., whether the portable electronic device is still within the reliable wireless coverage area 620). When the portable electronic device that is expected to arrive next at the incident area 615 is no longer within the reliable wireless coverage area 620, then the server computer 102 determines whether there are any other portable electronic devices that are still within the reliable wireless coverage area (at block 708) and, if so, advances to the next portable electronic device in the expected order of arrival at block 709 and, in some implementations, removes the "out-of-range" portable electronic device from the list of portable electronic devices that can still potentially receive data items for the incident. When the selected portable electronic device is still "in range" (e.g., is located within the reliable wireless coverage area 620), then the server computer 102 selects the highest priority data item remaining in the prioritized list of data items (at block 711). At block 713, the server computer 102 determines, based on the predicted data amount for the selected portable electronic device, whether there is enough time remaining to transmit the selected data item to the selected portable electronic device before it will enter the poor wireless coverage area 625.

When there is not enough time remaining, the server computer 102 repeatedly advances to the next data item in the list (at block 715) until a data item is identified that can be transmitted to the selected portable electronic device in the time remaining. Once a data item from the list is identified to be transmitted to the selected portable electronic device, the data item is removed from the list of remaining data items (at block 717) and the server computer 102 begins to transmit the data item to the vehicle (at block 719).

While continuously (or periodically) updating the predicted data amount for each portable electronic device in transit to the incident area 615 (at block 703), the server computer 102 then selects the next portable electronic device in the expected order of arrival (at block 705) and selects a data item remaining in the list of data items that can be transmitted to the next portable electronic device in the list. Similarly, once the transfer of the data item to a portable electronic device is complete (at block 721), that portable electronic device is added back to the list of available portable electronic devices (at block 723) and a new data item is identified that can be transmitted to that portable electronic device in the remaining predicted data amount for that portable electronic device.

The server computer 102 continues this process until it determines that there are no portable electronic devices remaining in the reliable wireless coverage area (at block 708) and then ends transmission of data items relating to the incident (at block 725). The computer server 102 then waits for a new incident to be initiated. However, in some implementations and scenarios (as discussed below), additional portable electronic devices might be dispatched to an incident to ensure that any critical data items are made available to portable electronic devices at the incident area 615. Furthermore, the computer server 102 may resume processing data items for an incident when the status of the incident changes such that one or more portable electronic devices dispatched to the incident become positioned in reliable wireless coverage areas (either additional portable electronic devices newly dispatched to the incident or earlier dispatch portable electronic devices that have moved to another geographic area).

Using a method such as the example illustrated in FIG. 7, the server computer 102 determines which portable electronic device of the plurality of portable electronic devices will arrive at the incident area first and selects the highest priority data items to be transferred to that particular portable electronic device. Similarly, when relatively large data items, such as large video files, cannot be transferred to one portable electronic device because the predicted data amount remaining for that portable electronic device is too small, the server computer 102 is able to identify whether another portable electronic device in transit to the incident area has a larger remaining predicted data amount that would be sufficient to ensure that the entire larger-size data item can be transmitted to that portable electronic device. Furthermore, when a high-priority data item has already been transmitted to another portable electronic device (or is in the process of transmission), the server computer 102 will identify the next highest priority data item to be transferred to another portable electronic device to ensure that redundant data is minimized and to maximize the number of data items that are made available to portable electronic devices at the incident area 615.

For example, the method of FIG. 7 may be used to transfer the data items from the prioritized list of FIG. 5 to the portable electronic devices being transported to the incident area 615 in the response vehicles as illustrated in FIG. 6. The server computer 102 determines (at blocks 701 through 707) that the portable electronic devices being transported by the first vehicle 601 and the sixth vehicle 611 will be the first two portable electronic devices to arrive at the incident area 615. However, because both of those portable electronic devices are already located in the poor wireless coverage area 625, the server computer 102 moves to the other portable electronic devices to attempt to transmit the data items. The server computer 102 determines that, of the portable electronic devices still located in the reliable wireless coverage area 620, the portable electronic device being transported by the fourth vehicle 607 will be the next to arrive at the incident area 615. The server computer 102 selects the "Incident Report" (see, FIG. 5) as the highest priority data item remaining in the list (at FIG. 7, block 711) and, after determining that the predicted data amount for the portable electronic device being transported by the fourth vehicle 607 is sufficient to transmit the 1 MB file size of the "Incident Report" (at FIG. 7, block 713), the "Incident Report" is removed from the list of data items (at FIG. 7, block 717) and is transmitted to the portable electronic device being transported by the fourth vehicle 607 (at FIG. 7, block 719).

Moving down the prioritized list in the example of FIG. 5, the server computer 102 may ultimately find that the five (5) Megabyte (MB) "Suspect Profile," the two (2) Gigabyte (GB) "Security Camera Footage," or the twenty (20) MB "Audio of 911 Call" may be too large to transmit to the portable electronic device being transported by the fourth vehicle 607 or even to portable electronic device being transported by the third vehicle 605 (i.e., the next portable electronic device in the expected order of arrival). As such, the server computer 102 will skip these files and find another, smaller data item to transfer to these portable electronic devices. The server computer 102 will similarly then advance through the list of portable electronic devices until another portable electronic device is identified with a large enough expected data volume remaining (e.g., the portable electronic device being transported by either the second vehicle 603 or the fifth vehicle 609) and, if possible, will transmit these larger data items to one of these portable electronic devices that is expected to arrive later at the incident area 615.

The examples discussed above (particularly in reference to the method of FIG. 7) present a looped operation in which one data item is transmitted to each individual portable electronic devices in transit to the incident area 615 at any given time and, once transmission of that data item is complete, another data item from the prioritized list is identified to transmission to that portable electronic device. However, in other implementations, a more comprehensive data item transfer plan is developed for the multiple portable electronic devices before any data items are transmitted. In such implementations, the server computer 102 is configured to identify one or more data items from the prioritized list of data items that will be earmarked for transmission to a specific portable electronic device based on the predicted data amount for that portable electronic device.

For example, again referring to the prioritized list of data items in FIG. 5 and the vehicle scenario of FIG. 6, the server computer 102 may first determine that both the "Incident Report" and the "Transcript of 911 Call" can be transmitted to the portable electronic device being transported by the fourth vehicle 605 before it enters the poor wireless coverage area 625. Although the next highest-priority data item in the list (i.e., the five (5) Megabyte (MB) "Suspect Profile") would cause the total file size to exceed the predicted data amount 635 for the portable electronic device being transported by the fourth vehicle 607, the subsequent item—the 1 MB "Floorplan Map"—could fit within the predicted data amount 635. Therefore, the server computer 102 would begin to transmit three data items to the portable electronic device being transported by the fourth vehicle 607 including the "Incident Report," the "Transcript of 911 Call," and the "Floorplan Map."

The server computer 102 would then proceed to allocate the remaining data items from the prioritized list to the remaining portable electronic devices in transit based on the size and relative priority of the remaining data items. For example, the server computer 102 might transmit the "Suspect Profile" to the portable electronic device being transported by the third vehicle 605 and, because the portable electronic device being transported by the second vehicle 603 has the largest predicted data amount 631, the server computer 102 would transmit the largest remaining data item—the two (2) gigabyte (GB) "Security Camera Footage"—to the portable electronic device being transported by the second vehicle 603 while the twenty (20) Megabyte (MB) "Audio of 911 Call" data item is transmitted to the portable electronic device being transported by the fifth vehicle 609. As a result, the highest priority data items arrive at the incident area as soon as possible and, although the largest data items take longer to arrive at the incident area 615, they also are eventually available for use by the other portable electronic devices when the last vehicle arrives at the incident area 615.

Figure 8:
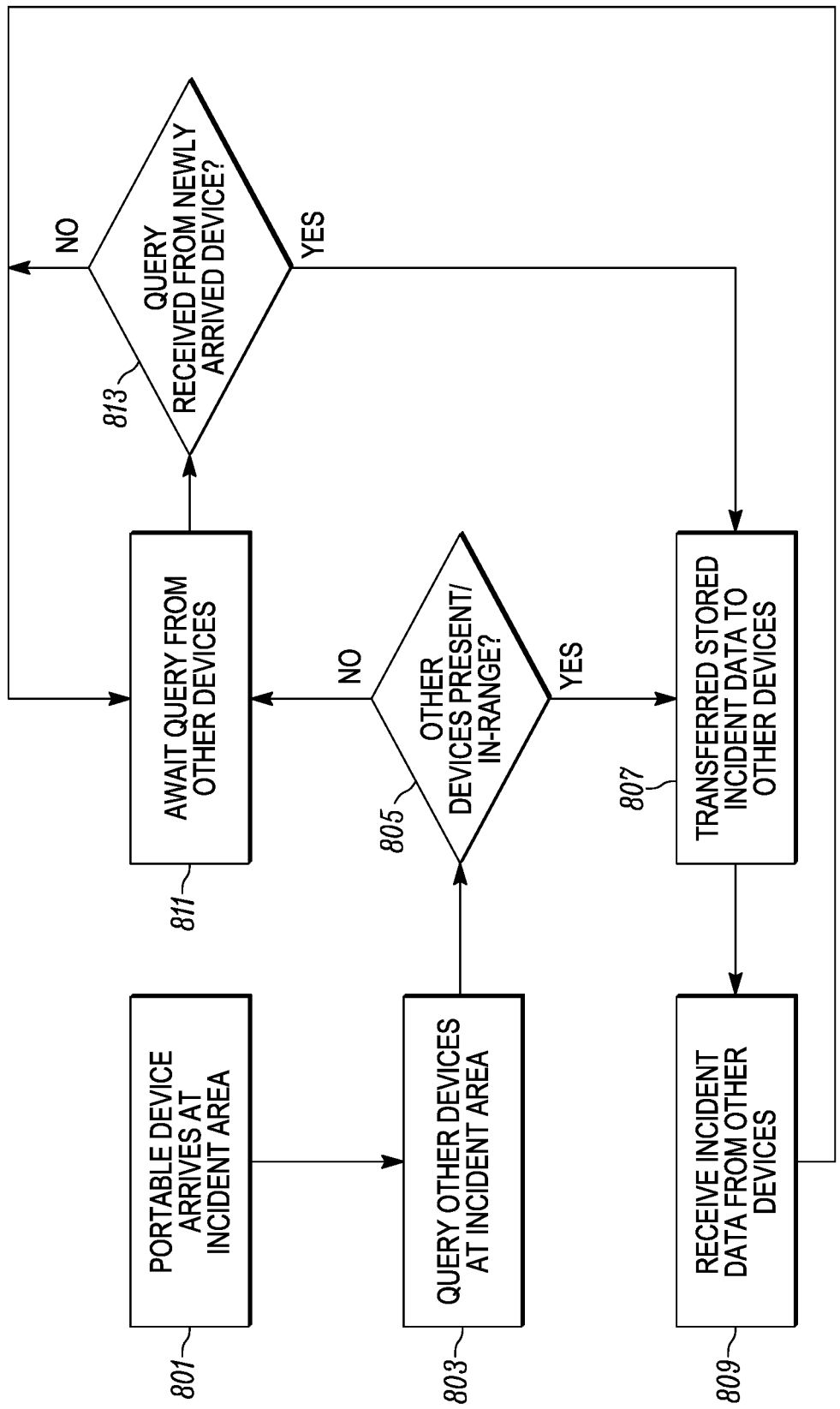
FIG. 8 is a flowchart of a method for sharing data items between portable electronic devices after arrival at an incident area in accordance with some embodiments.

When the portable electronic devices begin to arrive at the incident area 615, the data items are reassembled or otherwise made available to other portable electronic devices in the incident area network. One example of this process is illustrated in FIG. 8. When a particular portable electronic device (e.g., portable electronic device 101 from FIG. 1) arrives at the incident area 615 at block 801, the portable electronic device 101 queries the incident area network at block 803 to identify other portable electronic devices that are present and in-range for direct wireless communication between the portable electronic devices without requiring access to any wireless network (e.g., wireless network 111) that would provide for communication with the server computer 102. When, at block 805, the portable electronic device 101 determines that one or more additional portable electronic devices are present at the incident area and are in range for direct wireless communication, the portable electronic device 101 transfers any incident data items stored on its memory to the other portable electronic devices present at the incident area 615 (at block 807) and receives any incident data items stored on the other portable electronic devices (at block 809). In this way, the portable electronic device 101 is able to share with the other portable electronic devices any data items that were received from the server computer 102 before the portable electronic device 101 entered the poor wireless coverage area.

Once the newly arrived portable electronic device 101 has synchronized incident data items with the other portable electronic devices at the incident area 615, the portable electronic device 101 awaits for a query from any other portable electronic device that subsequently arrives at the incident area 615 (at block 811) and, in response to receiving another query (at block 813) performs another data transfer operation (at blocks 807 and 809) to synchronize incident data items with the subsequently arrived portable electronic device. Similarly, if, upon arrival, the portable electronic device 101 does not detect any other portable electronic devices at the incident area (at block 805), then the portable electronic device 101 continues to wait for a query from another portable electronic device (step 811) before performing any file transfers.

The data item synchronization discussed above in reference to FIG. 8 is only one example of how the portable electronic devices share the data items that each device received while in transit to the incident area. In other implementations, each individual portable electronic device 101 does not receive a full copy of every data item stored by the other devices at the incident area. Instead, upon arrival, the portable electronic device is added to the incident area network and constructs an incident data index indicating which data items are stored by which particular device in the incident area network and which data items are still in transit. As such, a specific data item is only transferred to another portable electronic device when that portable electronic device requests access to the data item.

In still other implementations, the server computer 102 may provide a data routing instruction to an individual portable electronic device 101 along with the data item that is transferred. The data routing instruction describes specific data routing steps that are to be performed by the portable electronic device 101 upon arrival at the incident area 615. For example, the data routing instruction may identify one or more specific other portable electronic devices to which a particular data item is to be transferred upon arrival at the incident area 615.

Figure 9:
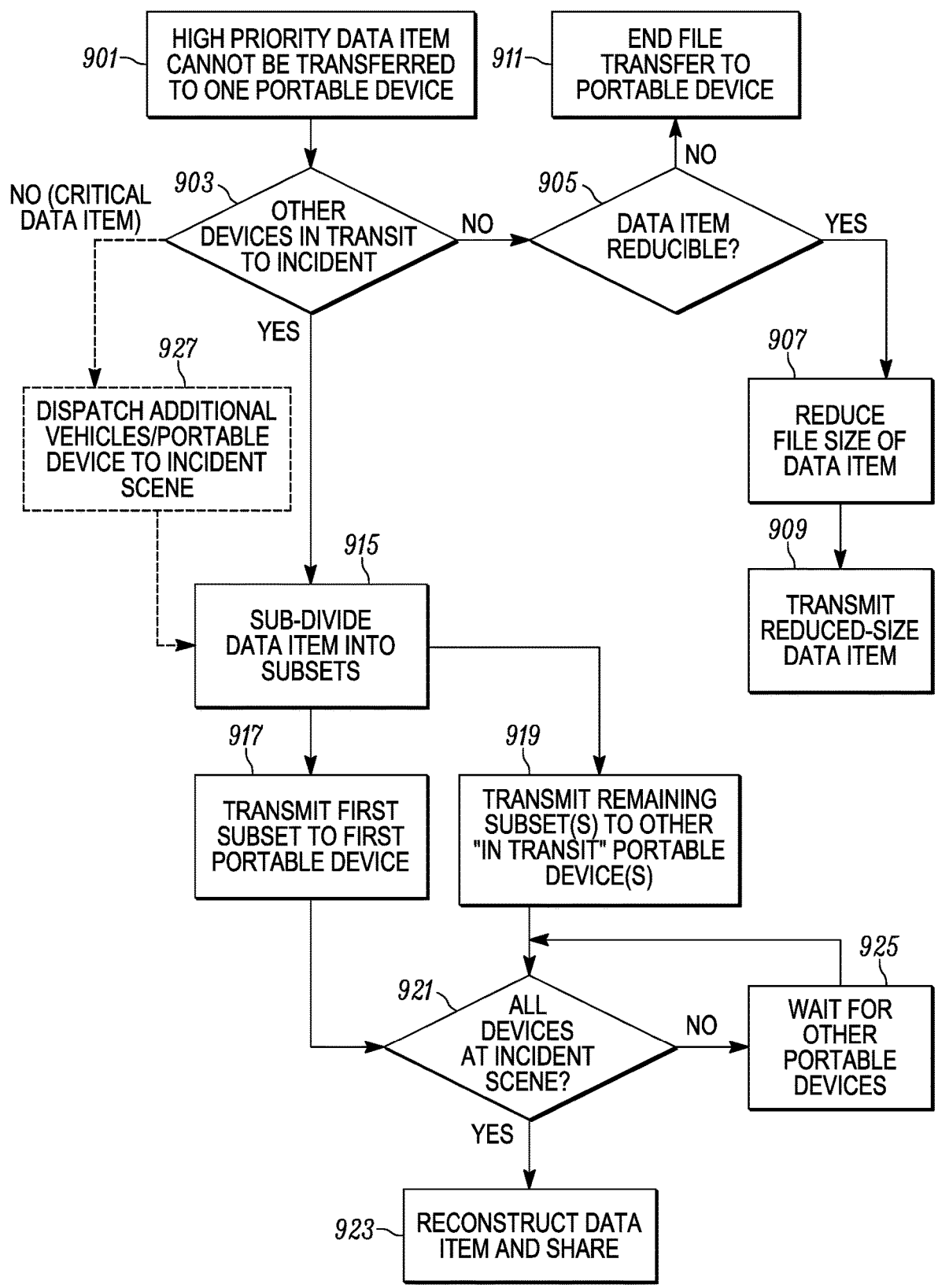
FIG. 9 is a flowchart of a method for transmitting a large file-size data item for use at an incident area in accordance with some embodiments.

As discussed above, the server computer 102 may encounter situations where a particular data item cannot be transmitted in its entirety to any single portable electronic device 101 before reliable wireless connectivity with that portable electronic device 101 is lost. Similarly, situations may arise where all portable electronic devices that are in transit to a given incident area have lost reliable wireless connectivity before the last remaining data items on the prioritized list of data items have been transmitted. In some implementations, the server computer 102 is configured to mitigate such situations by managing the transfer of data to the portable electronic devices. One example of such mitigation is illustrated in FIG. 9.

At block 901, the server computer 102 determines that a high-priority data item cannot be transferred in its entirety to a particular portable electronic device 101 before connectivity with that device is lost. The server computer 102 then determines at block 903 whether other portable electronic devices remain in transit to the incident area. When no other portable electronic devices remain in transit, the server computer 102 determines at block 905 whether the particular data item is reducible. A data item may be reducible if, for example, the length of a video/audio file or the resolution of a video/image/audio file can be reduced to correspondingly reduce the size of the data item. For example, one of the data items in the prioritized list of data items may include a surveillance video of a particular incident. To reduce the file size of the data item, the resolution of the video may be lowered or the video may be cropped so that only the most critical portions of the video are included in the reduced file size.

When the server computer 102 determines that the data item is reducible at block 905, the server computer 102 reduces the data item to a file size that can be transmitted to the portable electronic device in the estimated time remaining (i.e., a file size that is smaller than the predicted data amount remaining for the particular portable electronic device) (at block 907) and the reduced-size data item is transmitted to the portable electronic device (at block 909). However, when the data item is not reducible and there are no other portable electronic devices that remain in transit with reliable wireless connectivity, then, in some implementations, that particular data item is not transferred to any portable electronic device (at block 911).

On the other hand, when other portable electronic devices are still in transit to the incident area and still have reliable wireless connectivity (at block 903), then the data item is sub-divided into smaller subsets at block 915. A first subset of the data item is transmitted to the first portable electronic device 101 (at block 917) and the remaining subsets are transmitted to other portable electronic devices that are in transit to the incident area (at block 919). When the first portable electronic device 101 arrives at the incident area, it determines whether the other portable electronic devices carrying the other subsets of the data items have also arrived at the incident area (at block 921). When all of the portable electronic devices are present, the subsets of the data item are combined to reconstruct the data item (at block 923) and the reconstructed data item is shared with the other portable electronic devices on the incident area network. In some implementations, when fewer than all of the portable electronic devices are present at the incident area, the portable electronic devices wait for the others to arrive (at block 925) before reconstructing the data item (at block 923).

As discussed above, in some implementations, certain data items are reducible in that their file size can be made smaller by reducing the length or resolution of the data item. In the particular example discussed above, a surveillance video may be cropped to provide particularly relevant portions of the video or the resolution may be reduced. Similarly, when a large-size data items is divided into subsets (at block 915), one or more of the subsets might be made useable without the other subsets. For example, the server computer 102 may be configured to determine which portable electronic device is expected to arrive at the incident area first. A reduced length and/or reduced resolution version of the surveillance video may be transmitted to that first arriving portable electronic device so that it can be utilized immediately upon arrival at the incident area. As additional portable electronic devices subsequently arrive, they provide additional subsets of the data item to be recombined with the portion already stored by the first-arriving portable electronic device to improve the resolution of the surveillance videos or to increase the duration of the video.

Furthermore, in some implementations, when a reducible data item is subdivided and a useable portion of the data item is transferred to one of the portable electronic devices, the prioritized list may be updated to reflect the relative priority of the remaining portions (i.e., subsets) of the data items that would be necessary to restore the data item to its original form. For example, as long as a critical portion of the surveillance video is available for use, the remaining portion of the video may have a significantly lower relative importance. In some implementations, the database or look-up tables stored in memory will also include conditional information for reorganizing the prioritized list in response to reduced-size or partial file transfers such as these.

However, even with the mitigating steps discussed above in reference to FIG. 9, situations may arise where fewer than all of the data items can be transferred to portable electronic devices that are in transit to an incident area. As such, in some implementations, the server computer 102 is further configured to dispatch additional portable electronic devices in critical situations. For example, as discussed above in reference to FIG. 5, in some implementations, certain data items in the prioritized list of data items for an incident may be flagged or otherwise indicated as "critical." Returning now to the example of FIG. 9, in some implementations, the server computer is configured to identify situations where critical data items cannot be transferred to the portable electronic devices currently in transit to an incident area or, similarly, when critical data items remain untransferred after wireless connectivity is lost with all devices that have been dispatched an particular incident area at block 903). In some such implementations, the server computer 102 is further configured to dispatch additional portable electronic devices (and, accordingly, other users and response vehicles when applicable) to the incident (at block 927) such that the additional portable electronic devices can bring the remaining critical data items to the incident area. After the server computer 102 dispatches additional portable electronic devices in this manner (at block 927), the server computer 102 can then begin to transfer any remaining critical data items or subsets of critical data items to the newly dispatched portable electronic devices.

Although the discussion in the examples above refers primarily to a scenario where a vehicle (e.g., a response vehicle) has been dispatched to the scene of an emergency incident, the systems and methods presented herein are not necessarily limited to police or even to emergency incidents. For example, the data routing mechanisms and systems described above could be implemented to provide necessary data to a contractor in transit to a construction site (e.g., transmitting data items including blueprints, construction status reports, photographs, etc.). Alternatively, the data routing mechanism could be used, for example, to provide necessary data to a utility worker installing cable television or telephone lines in a home or business.

Furthermore, although the examples discussed above primarily refer to vehicles in transit to an incident area while an electronic portable device carried within the vehicle communicates to a server computer via satellite or cellular network, some of the techniques and systems described above can be implemented without the use of public communication networks and without the use of vehicles. For example, some of these systems and methods might be implemented by a security or maintenance management group for an individual building or a complex of buildings where some parts of the building/complex might be out-of-range or otherwise shielded from a Wi-Fi network or other local wireless communications network. As a particular example, a maintenance crew may be dispatched to perform maintenance or repair work on a boiler in a basement of a building—a location that does not have Wi-Fi connectivity. As the maintenance crew walks from their current location to the basement, the server computer schedules and manages the transfer of data items to portable electronic devices carried by each member of the maintenance crew such that, upon arrival at the basement location, the maintenance crew has access to information now stored on their portable electronic devices relating to the maintenance work to be performed on the boiler system.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A computer-implemented method for wirelessly transmitting data to be utilized at an incident area, the incident area having unreliable wireless connectivity between a plurality of portable electronic devices at the incident area and a server computer located remote to the incident area, the method comprising:

defining, by the server computer, a prioritized list of data items to be transmitted to a plurality of portable electronic devices for use at the incident area, the plurality of portable electronic devices including a first electronic device;

determining, by the server computer, a first estimated travel plan for a first portable electronic device in transit to the incident area;

predicting, by the server computer based on the first estimated travel plan for the first portable electronic device, a first predicted data amount that can be wirelessly transferred to the first portable electronic device before loss of reliable wireless connectivity between the first portable electronic device and the server computer;

automatically selecting, by the server computer, a first data item for transmission to the first electronic device from the prioritized list of data items based on a size of the first data item, a relative priority of the first data item, and the first predicted data amount that can be wirelessly transferred to the first portable electronic device, wherein the server computer selects, as the first data item for transmission, a data item that is not a highest priority data item of the prioritized list of data items in response to determining that the highest priority data item cannot be transferred to the first portable electronic device before loss of reliable wireless connectivity; and transmitting the first data item from the server computer to the first portable electronic device to be shared with at least one other portable electronic device at the incident area.

2. The computer-implemented method of claim 1, further comprising:

predicting, by the server computer based on a second estimated travel plan for a second portable electronic device, a second predicted data amount that can be wirelessly transferred to the second portable electronic device before loss of reliable wireless connectivity between the second portable electronic device and the server computer;

automatically selecting, by the server computer, a second data item for transmission to the second portable electronic device from the prioritized list of data items based on a size of the second data item, a relative priority of the second data item, and the second predicted data amount that can be wirelessly transferred to the second electronic device; and transmitting the second data item from the server computer to the second portable electronic device to be shared with at least one other portable electronic device at the incident area.

3. The computer-implemented method of claim 1, further comprising:

predicting, by the server computer, a predicted data amount that can be wirelessly transferred for each portable electronic device of the plurality of portable electronic devices before loss of reliable wireless connectivity between the server computer and each electronic device; and automatically selecting, by the server computer, one or more data items for transmission to each portable electronic device of the plurality of portable electronic devices based on a size of each data item, a relative priority of each data item, and the predicted data amount that can be wirelessly transferred to each electronic device of the plurality of portable electronic devices.

4. The computer-implemented method of claim 1, wherein defining the prioritized list of data items includes:

defining an incident type, wherein the incident type is indicative of a type of incident for which the plurality of portable electronic devices will be used at the incident area; and accessing from a non-transitory computer-readable memory the prioritized list of data items for the incident type, the non-transitory computer-readable memory storing a plurality of prioritized lists of data items, wherein each prioritized list of the plurality of prioritized lists corresponds to a different incident type of a plurality of incident types.

5. The computer-implemented method of claim 1, wherein determining a first estimated travel plan for the first portable electronic device in transit to the incident area includes periodically receiving, by the server computer, global positioning system information from the first portable electronic device; and determining, by the server computer, a current location and a current speed of the first portable electronic device based on the global positioning system information.

6. The computer-implemented method of claim 5, wherein predicting the first predicted data amount that can be wirelessly transmitted to the first electronic device before loss of wireless connectivity includes identifying, by the server computer, a geographic location in the first estimated travel plan with unreliable wireless connectivity;

determining, by the server computer based on the first estimated travel plan, an estimated amount of time until the first portable electronic device will arrive at the geographic location with unreliable connectivity;

determining, by the server computer, a current wireless data transmission rate for the first electronic device; and determining, by the server computer, the first amount of data that can be wirelessly transferred to the first portable electronic device before loss of reliable wireless connectivity based on the estimated amount of time and the current wireless data transmission rate for the first portable electronic device.

7. The computer-implemented method of claim 1, further comprising:

connecting the first portable electronic device to an incident area network upon arrival at the incident area; and sharing the first data item with other portable electronic devices connected to the incident area network.

8. The computer-implemented method of claim 1, wherein automatically selecting the first data item for transmission to the first portable electronic device includes identifying a highest-priority data item from the prioritized list of data items with a size that is less than the first predicted data amount that can be wirelessly transferred to the first portable electronic device before loss of reliable wireless connectivity.

9. The computer-implemented method of claim 1, wherein automatically selecting the first data item for transmission to the first portable electronic device includes selecting a data item with a size that exceeds the first predicted data amount that can be wirelessly transferred to the first portable electronic device before loss of reliable wireless connectivity, and further comprising:

dividing, by the server computer, the first data item into a plurality of partial data items, including a first partial data item with a size that is less than the first predicted data amount that can be wirelessly transferred to the first portable electronic device before loss of reliable wireless connectivity, wherein transmitting the first data item from the server computer to the first portable electronic device includes transmitting the first partial data item from the server computer to the first portable electronic device;

transmitting a second partial data item of the plurality of partial data items to a second portable electronic device; and reassembling the first data item from the first partial data item and the second partial data items after the first portable electronic device and the second portable electronic device have both arrived at the incident area.

10. The computer-implemented method of claim 9, wherein the first data item includes a digital video file, wherein dividing the first data item into a plurality of partial data items includes generating a first partial data item that includes a first playable version of the digital video file with a lower resolution, and wherein reassembling the first data item includes combining the first partial data item with the second partial data item to generate a second playable version of the digital video file with a higher resolution than the first playable version of the digital video file.

11. The computer-implemented method of claim 10, wherein the plurality of partial data items further includes a third partial data item, and further comprising:

transmitting the third partial data item to a third portable electronic device predicted to arrive at the incident area after the first portable electronic device and the second portable electronic device; and combining the second playable version of the digital video file with the third partial data item to generate a third playable version of the digital video file with a higher resolution than the second playable version of the digital video file.

12. A wireless communication system for wirelessly transmitting data to be utilized at an incident area, the incident area having unreliable wireless connectivity between a plurality of portable electronic devices at the incident area and a server computer located remote to the incident area, the system comprising:
- a first portable electronic device of the plurality of portable electronic devices;
- the server computer communicatively coupled to the first portable electronic device through a wireless network, the server computer configured to
  - define a prioritized list of data items to be transmitted to the plurality of portable electronic devices for use at the incident area,
  - determine a first estimated travel plan for a first portable electronic device in transit to the incident area,
  - predict, based on the first estimated travel plan for the first portable electronic device, a first predicted data amount that can be wirelessly transferred to the first portable electronic device before loss of reliable wireless connectivity between the first portable electronic device and the server computer,
  - automatically select a first data item for transmission to the first electronic device from the prioritized list of data items based on a size of the first data item, a relative priority of the first data item, and the first predicted data amount that can be wirelessly transferred to the first portable electronic device,
  - transmit the first data item to the first portable electronic device; and
- a second portable electronic device configured to access the first data item from the first portable electronic device when both the first portable electronic device and the second portable electronic device are at the incident area.

13. The wireless communications system of claim 12, wherein the server computer is further configured to
- predict, based on a second estimated travel plan for the second portable electronic device, a second predicted data amount that can be wirelessly transferred to the second portable electronic device before loss of reliable wireless connectivity between the second portable electronic device and the server computer,
- automatically select a second data item for transmission to the second electronic device from the prioritized list of data items based on a size of the second data item, a relative priority of the second data item, and the second predicted data amount that can be wirelessly transferred to the second portable electronic device, and
- transmitting the second data item to the second portable electronic device to be shared with at least one other portable electronic device at the incident area.

14. The wireless communications system of claim 12, wherein the server computer is further configured to
- predict an amount of data that can be wirelessly transferred to each portable electronic device of the plurality of portable electronic devices before loss of reliable wireless connectivity between each portable electronic device and the server computer, and
- automatically select one or more data items to be transmitted to each portable electronic device of the plurality of portable electronic devices based on a size of each data item from the prioritized list of data items, a relative priority of each data item, and the predicted data amount that can be wirelessly transferred to each electronic device before loss of reliable wireless connectivity.

15. The wireless communication system of claim 12, wherein the server computer is configured to define the prioritized list of data items by
- defining an incident type; and
- accessing from a non-transitory computer-readable memory the prioritized list of data items for the incident type, the non-transitory computer-readable memory storing a prioritized list of data items for each of a plurality of incident types.

16. The wireless communication system of claim 12, wherein the server computer is configured to predict the first amount of data that can be wirelessly transferred to the first portable electronic device before loss of reliable wireless connectivity by
- identifying a geographic location in the first estimated travel plan with unreliable wireless connectivity between the first portable electronic device and the server computer;
- determining, based on the first estimated travel plan, an estimated amount of time until the first portable electronic device will arrive at the geographic location with the unreliable wireless connectivity;
- determining a current wireless data transmission rate for the first portable electronic device; and
- determining the first predicted data amount that can be wirelessly transferred to the first portable electronic device before loss of reliable wireless connectivity based on the estimated amount of time and the current wireless data transmission rate for the first portable electronic device.

17. The wireless communication system of claim 12, wherein the server computer is configured to automatically select the first data item for transmission to the first portable electronic device by identifying a highest-priority data item from the prioritized list of data items with a size that is less than the first predicted data amount that can be wirelessly transferred to the first portable electronic device before loss of reliable wireless connectivity.

18. The wireless communication system of claim 12, wherein the server computer is configured to automatically select the first data item for transmission to the first portable electronic device by selecting a data item with a size that exceeds the first predicted data amount that can be wirelessly transferred to the first portable electronic device before loss of reliable wireless connectivity, and wherein the server computer is further configured to
- divide the first data item into a plurality of partial data items, including a first partial data item with a size that is less than the first predicted data amount that can be wirelessly transferred to the first electronic device before loss of reliable wireless connectivity and a second partial data item,
- transmit the first partial data item to the first portable electronic device, and
- transmit the second partial data item to the second portable electronic device to be recombined with the first partial data item after the first portable electronic device and the second portable electronic device both arrive at the incident area.

19. The wireless communications system of claim 18, wherein the first data item includes a digital video file,
- wherein the server computer is configured to divide the first data item into a plurality of partial data items such that the first partial data item includes a first playable version of the digital video file with a lower resolution, and wherein the first portable electronic device is configured to combine the first partial data item with the second partial data item upon receiving the second partial data item from the second portable electronic device to generate a second playable version of the digital video file with a higher resolution than the first playable version of the digital video file.

20. The wireless communications system of claim 19, wherein the plurality of partial data items further includes a third partial data item,
   wherein the server computer is further configured to transmit the third partial data item to a third portable electronic device of the plurality of portable electronic devices, and
   wherein the first portable electronic device is further configured to combine the second playable version of the digital video file with the third partial data item upon receiving the third partial data item from the third portable electronic device to generate a third playable version of the digital video file with a higher resolution than the second playable version of the digital file.

* * * * *